(12) United States Patent
Storms et al.

(10) Patent No.: US 12,204,649 B2
(45) Date of Patent: Jan. 21, 2025

(54) SECURITY ASSESSMENT PLATFORM

(71) Applicant: Copado, Inc., Chicago, IL (US)

(72) Inventors: Andrew Charles Storms, San Francisco, CA (US); Daniel C. Riedel, San Francisco, CA (US)

(73) Assignee: Copado, Inc., Chicago, IL (US)

( * ) Notice: Subject to any disclaimer, the term of this patent is extended or adjusted under 35 U.S.C. 154(b) by 1108 days.

(21) Appl. No.: 16/969,663

(22) PCT Filed: Feb. 13, 2019

(86) PCT No.: PCT/US2019/017774
§ 371 (c)(1),
(2) Date: Aug. 13, 2020

(87) PCT Pub. No.: WO2019/160905
PCT Pub. Date: Aug. 22, 2019

(65) Prior Publication Data
US 2020/0401703 A1 Dec. 24, 2020

Related U.S. Application Data

(60) Provisional application No. 62/630,482, filed on Feb. 14, 2018.

(51) Int. Cl.
*G06F 21/57* (2013.01)
*G06F 9/48* (2006.01)
(Continued)

(52) U.S. Cl.
CPC ............ *G06F 21/577* (2013.01); *G06F 9/485* (2013.01); *G06F 11/3409* (2013.01); *G06N 20/00* (2019.01); *G06F 2221/034* (2013.01)

(58) Field of Classification Search
CPC .... G06F 21/577; G06F 9/485; G06F 11/3409; G06F 2221/034; G06N 20/00; H04L 63/1441
See application file for complete search history.

(56) References Cited

U.S. PATENT DOCUMENTS

2011/0119106 A1   5/2011   Dahl et al.
2014/0142998 A1   5/2014   Kroeger et al.
(Continued)

OTHER PUBLICATIONS

PCT International Search Report from the PCT appln PCT/US2019/017774, dated Feb. 13, 2019, 12 pages.

*Primary Examiner* — Izunna Okeke
(74) *Attorney, Agent, or Firm* — Thompson Coburn LLP; Benjamin L. Volk, Jr.

(57) ABSTRACT

A platform is described for collecting and providing intelligence regarding security and/or other aspect(s), and for providing an assessment of the security and/or other aspects of the organization based on the collected and analyzed intelligence. In some implementations, the platform may assess security according to a lean security paradigm, and the platform may be described as a lean security intelligence platform. The platform provides a set of integrated tools for measurement, analytics, and reporting of security aspects and/or other aspects of an organization. The platform provides master assessment scores that gauge the maturity levels of the organization's overall security and/or compliance readiness, in some instances in accordance with Lean Security practices and/or principles. The platform provides access to an organization's analysis with respect to various metrics that are monitored over time determine whether the organization's performance is improving (or degrading) with respect to the metrics.

26 Claims, 15 Drawing Sheets

(51) Int. Cl.
*G06F 11/34* (2006.01)
*G06N 20/00* (2019.01)

(56) References Cited

U.S. PATENT DOCUMENTS

| | | |
|---|---|---|
| 2016/0248799 A1 | 8/2016 | Ng et al. |
| 2018/0025157 A1 | 1/2018 | Titonis et al. |
| 2018/0082233 A1* | 3/2018 | Apshankar ............ G06F 11/328 |
| 2019/0166153 A1* | 5/2019 | Steele ................ H04L 63/1441 |

* cited by examiner

SECURITY ASSESSMENT PLATFORM

CROSS-REFERENCE TO RELATED APPLICATION

This application is a National Stage Application under 35 U.S.C. § 371 and claims the benefit of International Application No. PCT/US2019/017774, filed Feb. 13, 2019, which claims priority to U.S. Provisional Patent Application Ser. No. 62/630,482, titled "Security Assessment Platform," which was filed on Feb. 14, 2018, both of which are incorporated by reference in their entirety herein.

BACKGROUND

Various types of organizations in different domains strive to establish and improve the security, reliability, efficiency, cost-effectiveness, and/or other operational aspects of the organization. Such efforts to improve operational aspects have traditionally been a challenge for most organizations, given the potentially large number of systems and personnel to be evaluated, and also given the difficulties in gathering objective information regarding a current state of operations within an organization. Existing tools, if any, provide ad hoc, arbitrary, and subjective evaluations that may be incorrect and out-of-date, and may be unduly influenced by current stakeholders within the organization being evaluated.

SUMMARY

Implementations of the present disclosure are generally directed to a platform for assessing the security and/or other aspects of an organization. More particularly, implementations of the present disclosure are directed to a platform that accepts input data regarding aspects of an organization and/or operational systems, analyzes the input data to develop metrics regarding the state of the organization and/or tasks to be performed to improve metrics, and presents information regarding metrics and/or tasks to individuals within and/or outside the organization.

In general, implementations of innovative aspects of the subject matter described in this specification can be embodied in a method that includes the following operations: receiving input data that is provided through an assessment platform; analyzing the input data to generate one or more metrics that each provide a measurement of an operational aspect of an organization; generating one or more tasks based on one or more of the input data and the one or more metrics; and presenting the one or more metrics and the one or more tasks through a user interface (UI) of the assessment platform.

These and other implementations can each optionally include one or more of the following innovative aspects: the analyzing of the input data employs at least one machine learning technique; the input data is generated by at least one data collection module that executes in the assessment platform to automatically generate the input data based on examination of one or more systems under assessment (SUAs) that are associated with the organization; the input data is entered through the UI of the assessment platform; the UI presents at least one question that is answered, through the UI, to generate at least a portion of the input data; a particular answer to a question causes a satisfier, executing in the assessment platform, to automatically generate at least one of the one or more tasks; the one or more metrics include one or more of a core principle metric, a category metric, and a subcategory metric; the one or more tasks are organized into one or more stories that each includes at least one task; and/or the operations further include receiving, through the UI, an indication of completion of at least one of the one or more tasks and, in response, updating at least one of the one or more metrics based on the completion of the at least one task.

Other implementations of any of the above aspects include corresponding methods, apparatus, and/or computer programs that are configured to perform the actions of the system. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations provide various technical advantages and/or technical improvements compared to previously available solutions. By providing a platform that collects input data regarding organization operations, automatically analyzes the input data to generate metrics and/or tasks, and presents the metrics and/or tasks through a user interface of the platform, implementations provide an assessment platform that avoids data entry errors, assessment inaccuracies, inefficiencies, and/or omissions that are commonly exhibited by traditional assessment services. Accordingly, implementations make more efficient use of processing power, storage space, active memory, networking capacity, and/or other computing resources compared to traditional solutions. Moreover, in some implementations the platform provides a baseline of scores to be used for later comparison, to identify operational degradation and/or other problems, and to determine a method or strategy (e.g., roadmap) that can be followed to increase scores in a positive direction based on operational improvements. Implementations enable the systems to be reassessed (e.g., periodically) for rescoring, such that changes in the scores can be identified. The platform can also provide information that enables operators to understand the potential benefits of investment in fixing one or more problem area, by presenting information describing the outcome of such investment, thus enabling a comparison of the cost of investment to the benefit (or potential benefit) that can manifest in later operational cost savings.

It is appreciated that implementations in accordance with the present disclosure can include any combination of the aspects and features described herein. That is, implementations in accordance with the present disclosure are not limited to the combinations of aspects and features specifically described herein, but also include any other appropriate combinations of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
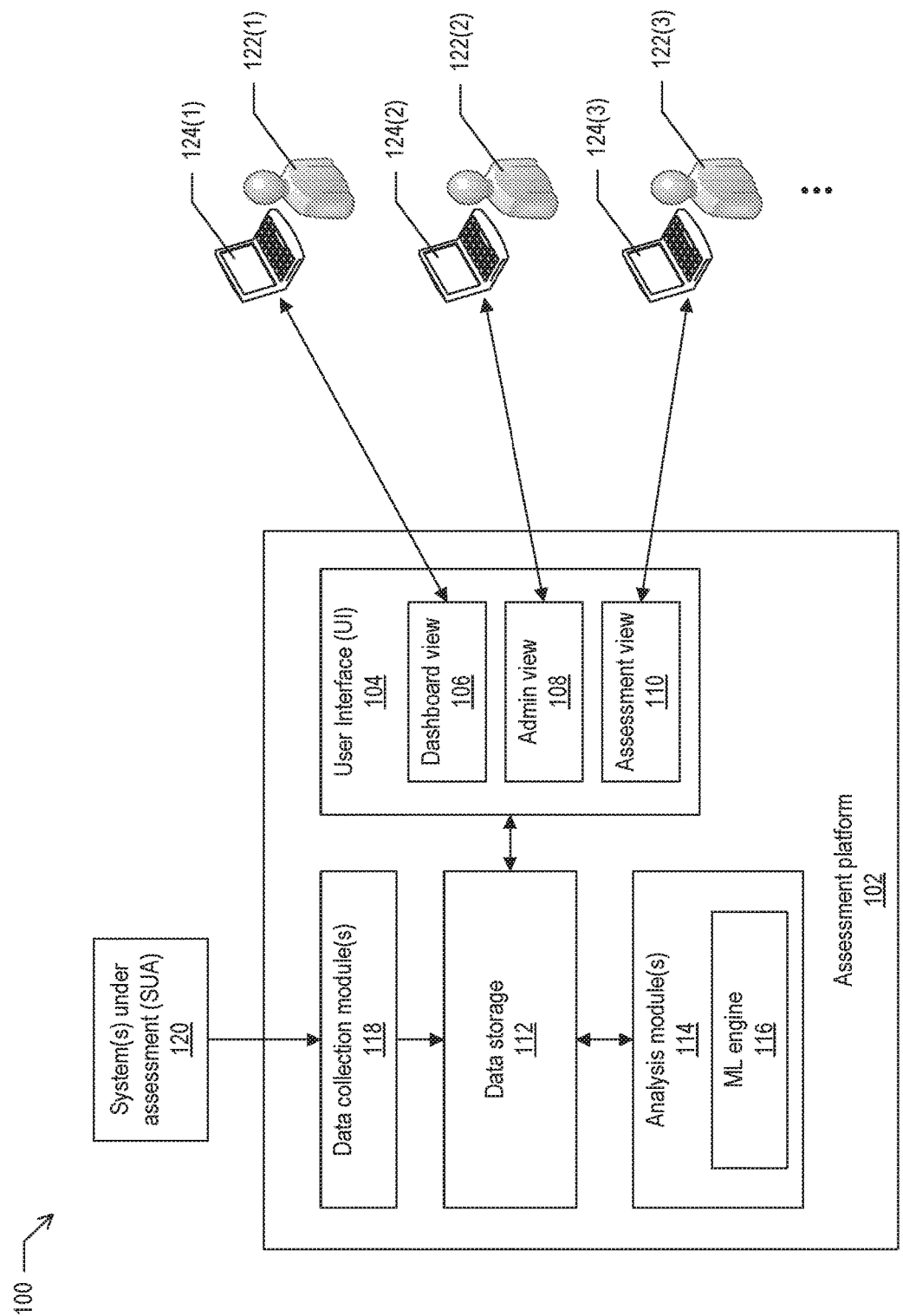
FIG. 1 depicts an example environment for assessment of security or other aspects of an organization, according to implementations of the present disclosure.

Implementations of the present disclosure are directed to devices, methods, and computer-readable media for assessing the security and/or other aspects of an organization. Implementations provide a platform for collecting and providing intelligence regarding security and/or other aspect(s), and for providing an assessment of the security and/or other aspects of the organization based on the collected and analyzed intelligence. In some implementations, the platform may assess security according to a lean security paradigm, and the platform may be described as a lean security intelligence platform. The platform provides a set of integrated tools for measurement, analytics, and reporting of security aspects and/or other aspects of an organization.

In some implementations, the platform provides master assessment scores that gauge the maturity levels of the organization's overall security and/or compliance readiness, in some instances in accordance with Lean Security practices and/or principles. Individuals within the organization may be provided, through the platform, with instant access to their organization's analysis as distilled into key performance indicators (KPIs), also described herein as metrics. Changes in these indicators can be monitored over time through the platform, to enable individuals to determine whether their organization's performance is improving (or degrading) with respect to the KPIs. In some implementations, the platform provides multiple (e.g., 30) metrics that measure various aspects of an organization's security environment, including use of Agile, DevOps culture, security, compliance, and/or other aspects. In some implementations, the platform allows for an organization to be scored (by themselves and/or outside assessment personnel) on four core Lean Security principles: awareness, measurement, simplification, and automation. The platform can also provide an online dashboard that reports and summarizes the level of adherence to Lean Security best practices: automation, measure, simplify, and awareness. The platform can provide (e.g., executive-level) visibility with descriptions of achievable goals and how these goals affect Lean Security measurement when completed.

The platform provides various user interface (UI) screens or views that present information regarding the metrics determined for an organization and/or other assessment information. For example, a scoring dashboard (also described as an assessment view) presents information describing the gaps and/or strengths of an organization with respect to Lean Security and/or other assessment paradigms. The platform provides a ratings system that gauges an organization's performance according to various metrics. This quantitative scoring system provides information that personnel within an organization can use to focus on key areas to strengthen or improve security practices, and the effects of actions taken to strengthen or improve security can then be measured as a change in metrics presented through the platform UI. Accordingly, the platform provides an assessment of an organization as well as the tools to enable and monitor improvements within the organization.

In some implementations, the platform also provides a roadmap, including a set of tasks that can be performed within an organization to improve the organization's security and/or other aspects. The roadmap provides direction to an organization as well as sets goals for an organization to work toward to improve security and/or other aspects. For example, by using the reporting and analysis provided by the platform, the personnel of the organization can receive a detailed roadmap of strategic initiatives to mature the organization toward a more robust security posture. In some instances, the roadmap and goals give product and engineering departments a roadmap to reach strategic goals. Through a tasks view UI, the platform provides tangible actions and milestones for input that can be used for project planning and story development. The platform also tracks progress and shows improvement based on the organization's completion of tasks included in the outlined roadmap.

In some instances, the platform is useable by information security specialists, project management, technical writers, and others who can assess the security situation of an organization and provide input data to analysis by the platform. In some implementations, input data may also be provided by automated data collection module(s) that execute within the platform or elsewhere to collect input data for assessment of an organization. Such processes are described in more detail below. In some implementations, the assessment process utilizes the platform for delivery of reporting, analysis and scoring of findings. The platform supports and displays the security assessment (e.g., the Lean Security Assessment) as well as additional follow-ups and periodic (e.g., quarterly) check-ins. The updates can occur periodically (e.g., once per calendar quarter) and/or according to other suitable timing. Delivery of the results, score and reporting can occur within the platform.

In some implementations, the platform provides a Lean Security Assessment that includes four identified stages of an assessment: vision, collection, analysis, and reporting. A support team can use the platform to begin on-boarding the organization into a Lean Security framework, by understanding the organization's vision, strategy, and mission. An iterative and cyclical process can then be performed to collect input data, analyze the input data, and generates reports regarding the analysis. In some instances, the vision includes an executive-level (e.g., C-level) vision of an organization, including strategy and mission descriptions. The collection of input data employs tools, cultural information regarding an organization, interviews, processes, and/or other data generation techniques. Analysis of the input data can include planning, evaluating, providing suggestions, and so forth. Reporting may be performed through the platform itself and/or through external tools and/or communication channels.

In some implementations, the security assessment performed by the platform includes the following activities: on-boarding of the organization into the assessment process; creation of organizational challenges, vision, and strategy; collection of the organization's participant contact information, job roles, and organizational structure; interactive use of the platform (e.g., the assessment view) for collection of assessment information; initial analysis of participant scoring and ranking according to the Lean Security methodology; on-going information retrieval and input into the platform; on-going updates and generation of quantitative scoring analysis; generation of organizational gaps analysis, tasks, and goal setting to meet Lean Security best practices; final analysis scoring within the platform; delivery of objectives for the organization to meet strategic goals inclusive of quantitative scoring and tasks; and/or periodic (e.g., quarterly) follow-up Lean Security updates, performed based on a mutually agreed upon schedule between the organization and the assessing entity, focusing on investigating goals and accomplishments of the organization since the last update.

In some implementations, the security assessment performed by the platform includes various categories. For example, the platform can assess an organization's processes, people, culture, and tools with respect to DevOps and security industry best practices, and/or other benchmarks. Culture categories for assessment can include transparency, communications, collaboration, leadership, and/or trust. Tools categories for assessment can include orchestration, chat, instrumentation, monitoring, source code management, issue tracking, and/or integration. Processes categories for assessment can include software or systems development lifecycle (SDLC), pipeline, measure, agile, code review, and/or training.

As part of the support process and use of the platform, the organization's stakeholders and/or management can establish time-based objectives of the organization's processes, culture, and tools for particular (e.g., six-month and/or twelve-month) milestones. For example, objectives can include: software delivery pipeline time-to-market objectives; software delivery of applications and infrastructure readiness for development staff; the use of automation and instrumentation; and/or adherence to information security compliance objectives. Findings can be delivered within the interactive platform and/or in the form of an executive management-level presentations, and such findings can include a gap analysis and/or roadmap showing a path to reach the organization's goals.

FIG. 1 depicts an example environment 100 for assessment of security or other aspects of an organization, according to implementations of the present disclosure. As shown in the example of FIG. 1, the environment 100 includes an assessment platform 102, also described as the platform. The platform 102 includes a UI 104 that can include any suitable number of views (e.g., screens, portals, etc.). The UI 104 may be a web interface or any other suitable type of user interface. In some implementations, the UI 104 includes a dashboard view 106, an administrative (admin) view 108, and an assessment view 110. These views are described further below. The views may be accessed by users 122 using user devices 124, and particular views may be provided for different users 122 that perform different roles. For example, the dashboard view 106 may be accessed, using a device 124(1), by a user 122(1) who is a stakeholder, C-level executive, or other individual within an organization (e.g., a company, business, or other type of organization). The admin view 108 may be accessed, using a device 124(2), by a user 122(2) who is an administrator of the platform 102. The assessment view 110 may be accessed, using a device 124(3), by a user 122(3) who uses the platform 102 to collect input data regarding the organization, and provide the input data to the platform 102 for analysis.

In some implementations, the UI 104 authenticates each user 122 based on provided credentials (e.g., username, password, etc.), and a particular user 122 is authorized to access one or more view(s) based on their identity and/or role within the organization and/or with respect to the platform 102. A particular user 122 may perform a single role or multiple roles, and may be authorized to access one or more views of the UI 104.

In some implementations, the platform 102 includes data storage 112 of any suitable type and/or storage format, including relational and/or non-relational data storage. In some implementations, the data storage 112 is external to the platform 102, and accessible from the platform 102 over one or more networks. The data storage 112 can store input data, metrics data, and/or tasks data as described below, as well as other information for the operations of the platform 102, such as information regarding the users of the platform, their roles, permissions, and so forth.

The platform 102 executes one or more analysis modules 114, which analyze the input data to generate tasks and/or metrics regarding an organization. In some implementations, the analysis module(s) 114 include a machine learning (ML) engine 116. The ML engine 116 may apply one or more suitable ML techniques, and/or artificial intelligence (AI), to generate metrics and/or tasks, as described further below.

In some implementations, the input data for analysis is provided through the UI 104, e.g., by users 122 who enter the input data through the assessment view. In some implementations, input data may also be provided by data collection module(s) 118 that execute to automatically generate input data. The data collection module(s) 118 may perform various operations to query, monitor, examine, and/or evaluate various systems under assessment (SUA) 120 that are operating with the organization being assessed. Such automatic data collection may be performed in addition to, or instead of, the input data collection through the UI 104, and is described further below.

Figure 2:
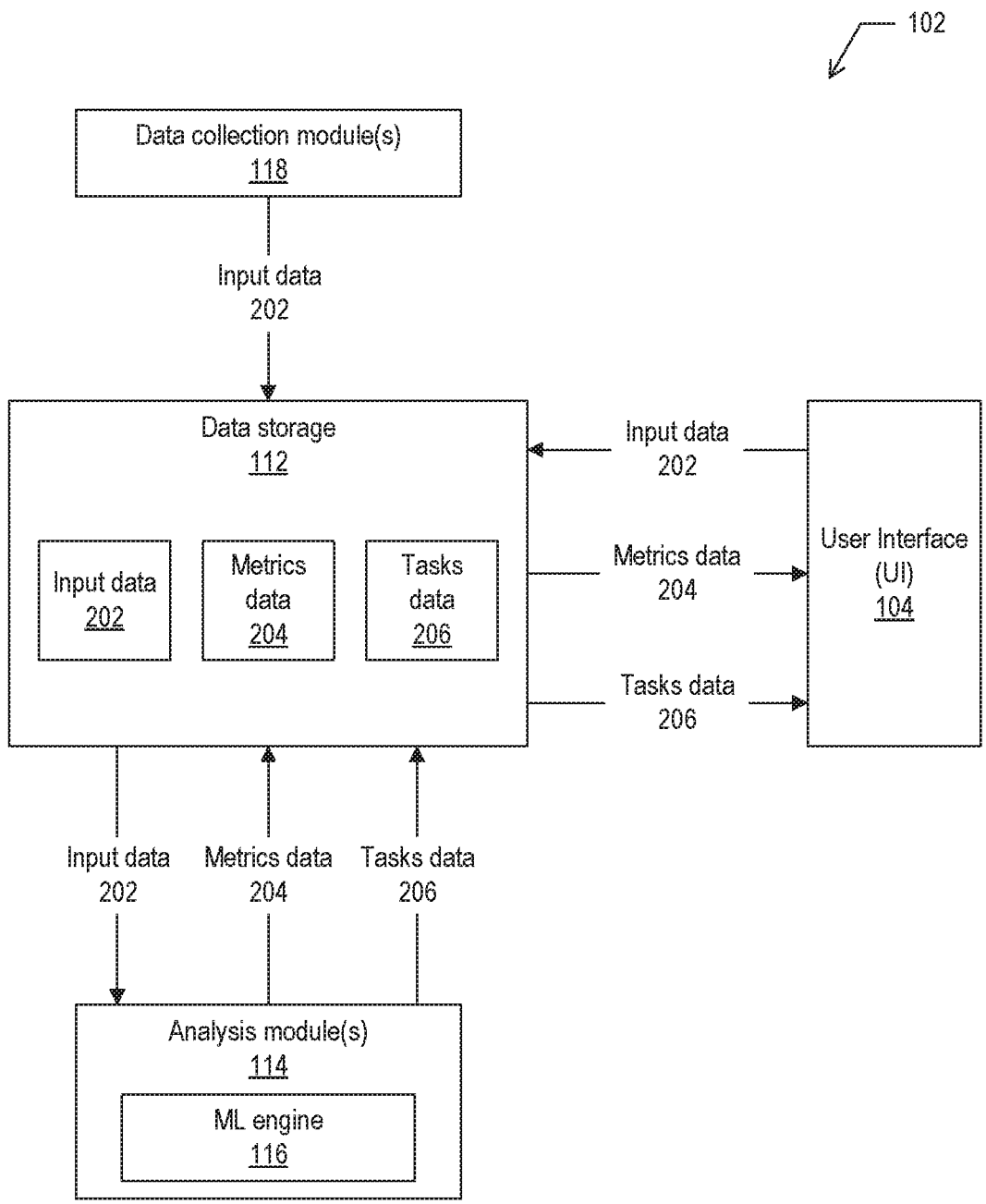
FIG. 2 depicts an example system of an assessment platform, according to implementations of the present disclosure.

FIG. 2 depicts an example system of an assessment platform 102, according to implementations of the present disclosure. As described above, input data 202 may be received through one or more views of the UI 104. Input data 202 may also be generated by data collection module(s) 118 that execute to monitor various SUA(s) 120 and generate input data 202 that describes the current (e.g., at the time of monitoring) status of the SUA(s) 120.

Implementations support various channels for generating the input data 202 that can be entered through the UI 104. For example, the input data 202 may be collected through interviews conducted by assessment personnel with employees of the organization under assessment. The interviewer may ask various questions of the employees to gain information regarding the operations of the organization. Input data 202 may also be generated by assessment personnel monitoring employees while the employees perform their jobs within the organization, sitting in on meetings, and/or reviewing available information regarding the organization (e.g., org charts, budget information, system specifications, and so forth). In some instances, the input data 202 can include cultural data regarding an organization. For example, cultural data can describe how well the organization functions, how well individuals in the organization work together as a team, whether individuals in an organization are arguing or fighting, whether the individuals are working together toward the same goal, how well the individuals handle conflict, whether the organization encourages innovation, individual thinking, or creativity, and so forth.

In some implementations, the input data 202 may be entered through the UI 104, through the assessment view 110. The assessment view 110 may present a series of questions that are answered by the assessment personnel, based on their interviews, observation of employees, observation of meetings, and/or other investigation. Assessment personnel may also distribute questionnaires, surveys, and/or other documents to employees. The completed documents may be entered as input data 202 through the assessment view 110, and/or the employees themselves may complete an online questionnaire and/or survey to automatically enter input data 202 into the platform 102.

The data collection module(s) 118 may examine different types of SUA(s) 120 by performing operations that are suitable for the particular SUA being monitored. In some instances, the data collection module(s) 118 may have machine-level access and/or API-level access to SUA(s) 120 being monitored, such as ticketing systems for managing trouble tickets within an environment. The data collection module(s) 118 may automatically analyze technical systems to answer questions regarding the systems, and thus generate input data 202 for analysis. For example, the module(s) 118 may examine network traffic to look for the presence of a chat application running on a network. The module(s) 118 may also interface with an Active Directory, lightweight direction access protocol (LDAP) system, some other identity and/or account management system to gain information about employees. Such information can be used as the input data 202 itself, and/or for identifying employees to receive questionnaires to fill out to generate input data 202. In some instances, the module(s) 118 may query various SUA(s) 120 to determine the services that are running and/or available for execution on the SUA(s) 120. For example, the module(s) 118 may query the SUA(s) 120 to determine the presence of a chat application, the particular users or types of users who use the chat application, and so forth. The module(s) 118 can also automatically examine domain name systems (DNSs), email systems, and so forth.

In some implementations, the module(s) 118 may also monitor and/or examine the following types of SUA(s) 120, to automatically generate input data 202 based on the monitoring and/or examination. These examples are not limiting, and implementations may also monitor and/or examine other types of SUA(s) to generate input data 202 for analysis.

A version control system, code repository, and/or code hosting service, such as GitHub™, can be examined to analyze accounts (e.g., users, groups, repos, etc.) and/or analyze a code base and/or source tree maintained within an organization.

A chat system (e.g., slack, hipchat, etc.) can be examined to gain an understanding (e.g., across team collaboration) of which employees within the organization talk to each other, the topics of their conversation, and so forth. For example, the module(s) 118 may include a chatbot that integrates into the organization's chat platform (e.g., as a virtual personal assistant), to receive meeting reminders, schedule meetings, retrieve contact information for various employees, determine when employees are active (e.g., making Git pushes, etc.). In some implementations, the chat bot may be built on a UI with integrated natural language processing.

A cloud-based (e.g., distributed) computing service, such as Amazon Web Services™ or similar, can be queries to retrieve information regarding the service, including health checks, security information, and so forth.

A directory service, such as Microsoft Active Directory™, LDAP, and/or other directory service can be queried to access information in a company directory, including employee names, titles, managerial status, roles, email addresses, logins to various services, and so forth. The directory service may also provide last login information indicating employees who are active or non-active, most active, least active, and so forth. A message transfer agent (MTA) log analysis can be performed to build a graph of who talks to who to identify people who are potentially key enablers (or blockers) of progress or accomplishment. That graph may be overlaid on an org chart to identify employees who are potentially over-performing or under-performing.

A pager system may be analyzed to determine pager service availability, including outages, uptimes, mean time to recover from outages, and so forth. The analysis may also identify the numbers and names of applications being monitored, and/or the names, contact info, and other information for on-call staff within an organization (e.g., staff who use the pager service).

Public sources for company reputation information and/or other types of public information may also be examined to gauge historical staff turn-over rates, the general likeability or popularity of a company in public discourse, news stories regarding the company, public exposure of the company with respect to press releases, public talks, presence at conferences or conventions, product/service marketing efforts, and so forth.

An issue tracking, trouble ticketing, and/or bug tracking system may be queries to retrieve information regarding past and current issues being addressed within the organization, the time required to address issues, personnel assigned to address issues, and so forth.

STIX or TAXII feeds, and/or other data sources may be monitored to determine current threat intelligence regarding possible cyber-attacks or other exploits. Security information and event management (SIEM) services may also be queries to retrieve log data, identify security issues, and/or gauge compliance with internal or external standards, regulations, and/or other types of constraints. Governance, risk management, and compliance (GRC) platforms may also be queries for governance, risk, and compliance data. Vulnerability scan data, open threat intelligence, and/or other security or threat data may also be accessed for analysis.

Network appliances and/or network management systems may be queried and/or examined to identify network layout, switch configurations, firewall configurations, egress filters, and/or other information describing networks used by the organization. A public DNS can be examined to synchronize data (e.g., using terraform) to add to an infrastructure page. DomainTools APIs may be monitored for information leakage via DNS records. Border gateway protocols (BGPs) can be monitored using tools such as logo management, new relic, and so forth. Extraneous and/or ephemeral data can be identified in DNS TXT. Whois and/or INTERNIC registration information can be queried. Technical forums can be monitored for potential information leakage. Data loss prevention (DLP) logs and/or alerts can also be monitored, as well as call records for SIP, voice over IP (VOIP), cellular, and/or other types of voice and/or video calls.

The input data 202 received from the UI 104 and/or module(s) 118 can be stored in the data storage 112 and provided to the analysis module(s) 114 for analysis. The analysis module(s) 114 analyze the input data 202 to generate metrics data 204 and/or tasks data 206, which can be stored in the data storage 112 and presented through the UI 104 to various authorized users 122. In some implementations, the analysis employs a ML engine to perform various ML and/or AI-based analyses of the input data 202.

Figure 3:
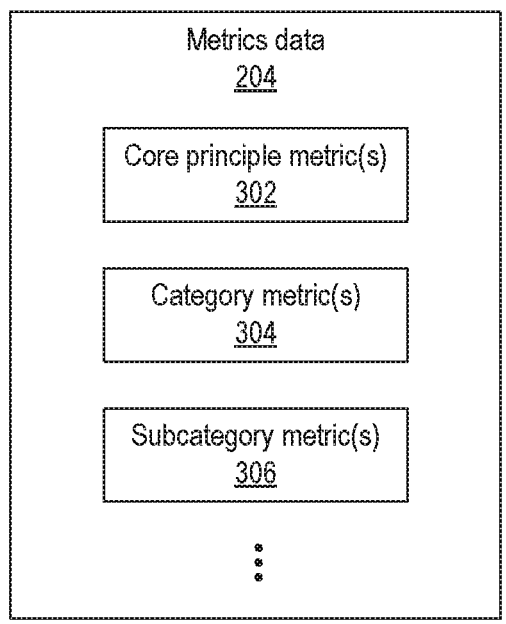
FIG. 3 depicts an example of metrics data, according to implementations of the present disclosure.

FIG. 3 depicts an example of metrics data 204, according to implementations of the present disclosure. The metrics data 204 can include any number of metrics that gauge how well the organization is performing with respect to particular performance aspects. The metrics data 204 can include core principle metrics 302 that gauge how well the organization is performing with respect to certain core principles, such as the core principles of awareness, measurement, simplification, and automation. The metrics data 204 can also include any number of category metric(s) 304 that measure the organization's performance with respect to various categories. Categories may include subcategories, and the metrics data 204 can include subcategory metrics 306 that indicate how well the organization is performing with respect to subcategories. The metrics data 204 can include metrics for categories and/or subcategories within a hierarchy tree that can be of any suitable depth and breadth. For example, the metrics can include metrics for categories, subcategories of the categories, subcategories of the subcategories, subcategories of the subcategories of the subcategories, and so forth. The UI 104 can display information describing the current values of the various metrics, as well as historical information showing changes in the metrics over time, previous values of the metrics, trends in metrics variation over time, and so forth. The UI 104 can also indicate goals for particular metrics, and track the progress of the organization is moving the various metrics toward their indicated goals. In some implementations, a metric is a numeric value within a range of possible values. For example, a metric may be a value in a range from 0 to 1, where 0 indicates minimum or absent compliance with the measured aspect (e.g., core principle, category, sub-category, etc.), and 1 indicates maximum or total compliance with the measured aspect.

Figure 4:
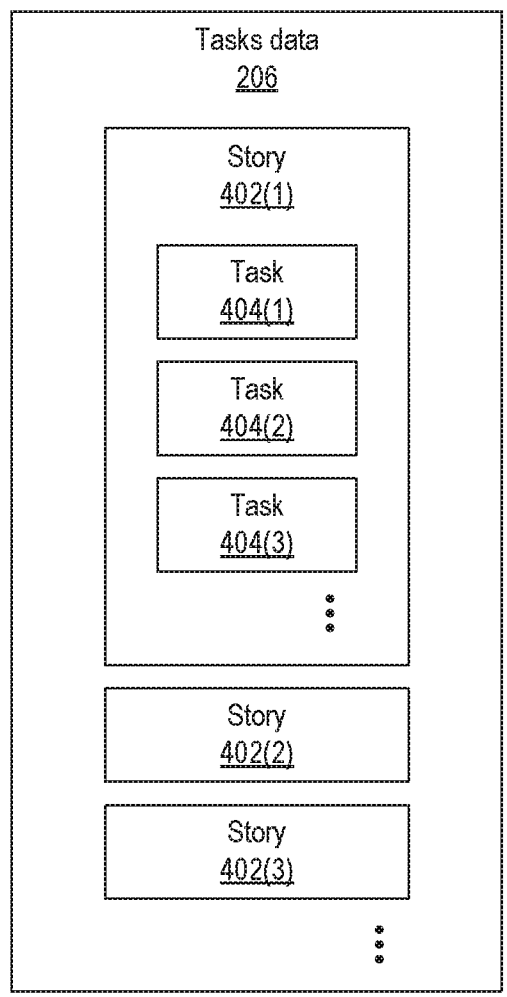
FIG. 4 depicts an example of tasks data, according to implementations of the present disclosure.

FIG. 4 depicts an example of tasks data 206, according to implementations of the present disclosure. A task is an action or set of actions to be performed within an organization, with the goal of improving one or more metrics. Accordingly, a task may be described as a recommendation action or set of actions to be performed. Tasks may be directed to computing systems, personnel assignments, and/or other aspects of the operations of the organization. As shown in FIG. 4, tasks 404 may be grouped into a story 402. A story 402 may include any number of tasks 404. A story may include tasks 404 that are to be performed in a particular (e.g., recommended or required) order, such that the tasks 404 are at least partly serial in nature. A story 402 may also include tasks 404 that can be performed in parallel and/or in arbitrary order as suited to the tasks to be performed and the personnel performing the tasks. The tasks data 206 may include any number stories 402, each of which can include any number of tasks 404. In some implementations, stories 402 may be arranged into super-stories, also described as epics. Accordingly, an epic may include any suitable number of stories 402. In this way, tasks data 206 also provides a hierarchy of task arrangement, with high-level epics including mid-level stories which include low-level tasks to be performed. The UI 104 may display information describing the number, proportion, and/or percentage of tasks that have been completed, as well as the current amount of progress toward completing higher level stories and/or epics.

Figure 5:
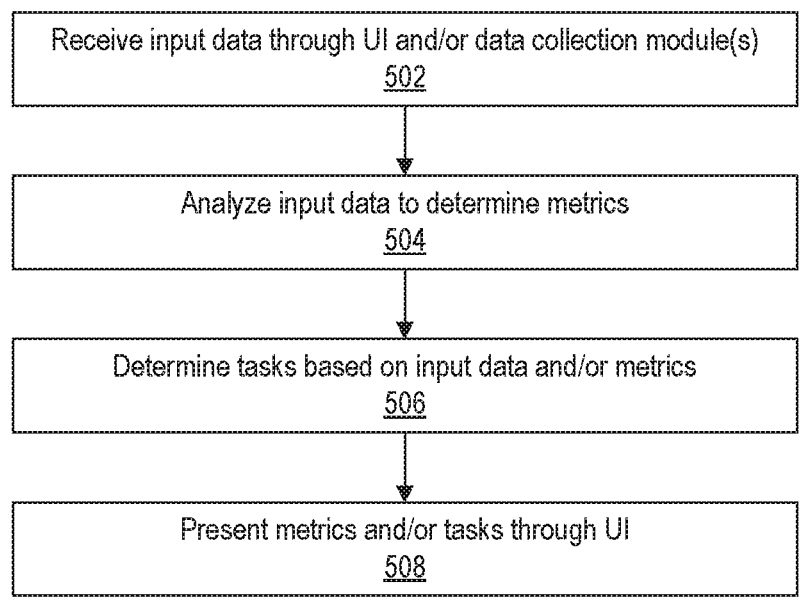
FIG. 5 depicts a flow diagram of an example assessment process, according to implementations of the present disclosure.

FIG. 5 depicts a flow diagram of an example assessment process, according to implementations of the present disclosure. Operations of the process can be performed by the UI 104, the analysis module(s) 114, the ML engine 116, and/or other software module(s) executing on the platform 102 or elsewhere.

Input data 202 is received (502) through the UI 104 and/or the module(s) 118, as described above. The input data 504 is analyzed (504) to determine one or more metrics. In some instances, metrics determination may employ ML and/or AI techniques. Task(s) are also determined (506) based on the input data and/or the metric(s). The metric(s) and/or task(s) are presented through the UI 104.

The platform 102, through its UI 104, outputs assessment results in the form of metrics and/or tasks for consumption by personnel of an organization. The assessment data gives the organization feedback and visibility into their status with respect to categories and core principles, for security assessment or other aspects, and gives an organization a path to follow to strengthen their security or otherwise improve other aspects of their organization. In some implementations, the platform collects information and provides feedback for a security paradigm such as lean security.

The dashboard view of the UI 104 can be accessed by personnel within the organization being assessed, such as employees, engineers, C-level personnel (e.g., CTO, CIO, etc.), and/or others with an interest in the technical operations, security situation, and/or other aspects of the organization that has agreed to participate in the assessment process using the platform, as provided by the assessment personnel. The dashboard view shows the progress of the assessment, such as a lean security assessment or other types of assessments. In some implementations, the dashboard view takes an organization through an arc of an assessment cycle, beginning with an understanding of the organization's vision and/or strategy with respect to security and/or other aspects to be assessed.

The assessment may then proceed to the data collection phase, where input data 202 is collected as described above. In some implementations, input data 202 is collected through the UI 104 (e.g., in the assessment view), through a series of basis questions that are posed to assessment personnel. The answers to the questions are then used to generate metrics. The questions may each map to a particular core principle and/or category, and the answers to the questions may be provided as input to an algorithm that generates metrics for the corresponding categories and/or principles based on the answers to the questions.

The dashboard view may display the core principles metrics that are determined based on analysis of the input data. The core principles metrics indicate a degree of adherence to core principles such as awareness, automation, measurement, and simplification. The dashboard may also display category and/or subcategory metrics that are also determined based on analysis of the input data. The category and/or subcategory metrics indicate a degree of adherence to categories and/or subcategories, such as monitoring, infrastructure, agile, and/or other aspects.

In some implementations, metrics generation is through application of a model that has been developed, using a suitable ML technique, to output a metric based on input data. A model may output a single metric and/or multiple metrics based on input data. In some implementations, the model is a classifier that has been trained, using classification ML techniques to predict a likely metric based on input data. The classifier may be trained using labeled training data that indicates, for each set, subset, or element of training data, a metric corresponding to the particular value(s) within the training data.

The results of the analysis may be presented in the dashboard view, and subsequently adjusted based on subsequently received input data (e.g., updated input data). The dashboard can show the change from the previous metrics, indicating progress (or lack thereof) in improving organizational performance along various axes of assessment.

In some implementations, the admin view provides an assessment builder tool that allows an administrator (e.g., assessment personnel that are not employees of the organization under assessment) to define an assessment to evaluate one or more metrics. The tool can be used to add questions to an assessment, remove questions from an assessment, and/or modify questions in an assessment. The assessment can be saved and published to be available to assessment personnel that will enter input data to answer the various questions of the assessment. For example, an assessment can include a question: "Is there an active chat room within the organization?" The possible answers to the question can be: Yes, accessible to development, operations, and security teams; Yes, accessible to development and operations teams; Yes, accessible to development team; or No, no active chat room is present. The answer to the question may affect one or more values of one or more metrics. In some implementations, answering the question triggers a satisfier to automatically create a task to be presented in the UI 104, such as a task to provide a chat room and/or change access permissions to an existing chat room.

The dashboard view can also show the status of various tasks, stories, and/or epics, as described above. The tasks, stories, and/or epics provide a road map for recommended actions to improve the score for various metrics. The dashboard may show a degree of completion (e.g., percentage complete) for tasks that are action items to be accomplished, and/or indicate that tasks have been completed or not yet started. Action items may be recommendations in the form of a list, sequence, or group of tasks (e.g., stories) to be completed. The tasks list may be described as a backlog of tasks to be completed. In some implementations, the tasks may be displayed in the dashboard with some indication of a level of effort, time, and/or expense that may be required to complete the task (e.g., easy tasks, harder tasks, etc.). The dashboard can filter and/or sort the displayed tasks based on level of effort, time, expense, completion status, corresponding core principles, categories, and/or subcategories, and/or other aspects. Marking a task as complete in the dashboard can trigger a dynamic re-evaluation of metric(s) based on the completion of the task, and the newly calculated metric(s) can also be updated in the dashboard. Accordingly, the dashboard allows organizational personnel to gauge the level of investment that may be required to complete a task, the progress in completing a task, as well as the results of completing the task. The admin view may include a ChatOps module that provides a summary of current activities to progress on certain tasks, as well as connections to individual tasks. The model may show how metrics will be affected when tasks are completed with respect to core principles, categories, and/or sub-categories.

In some implementations, the platform 102 provides one or more satisfiers that execute to determine tasks, stories, and/or epics in response to particular input data 202. For example, a satisfier may include an operator of Boolean logic that automatically determines, in response to a particular answer to a question presented in the assessment view, tasks and/or stories that are applicable based on the question being answered in a particular way. The action of answering the question triggers the creation of tasks and/or stories that are then presented to the organizational personnel through the dashboard, thus automating workflow to generate tasks/stories based on input data.

FIGS. 6A-6I depict example UI screens for an assessment platform, according to implementations of the present disclosure.

Figure 6A:
FIGS. 6A-6I depict example user interface screens for an assessment platform, according to implementations of the present disclosure.

FIG. 6A shows an example screen that includes a section 602 and a section 604. Section 602 presents a graphic showing assessed and adjusted metrics for each of four Lean Security categories of Security, DevOps, Agile, and Compliance. Section 604 presents a list of Stories that are being tracked within the platform. The list shows, for each tracked Story: a title (e.g., "Implement Continuous Integration (CI) tool chain as part of the development pipeline"), status (e.g., To Do, In Progress, or Completed), a degree of compliance with various categories, subcategories, and/or core principles (e.g., Simplification, DevOps, Pipeline, etc.).

Figure 6B:
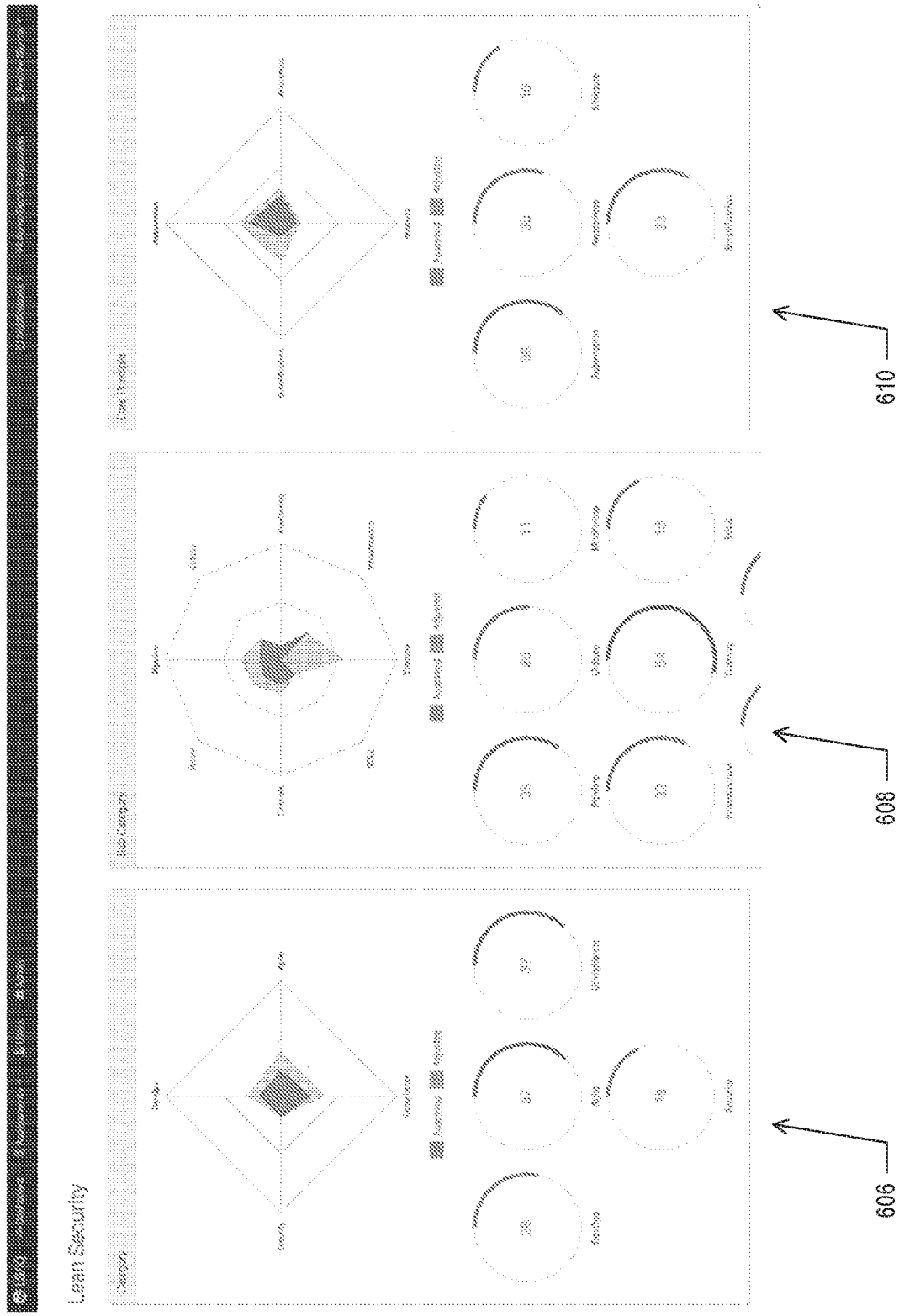

FIG. 6B shows an example screen that includes sections 606, 608, and 610. Each of these sections presents graphics showing assessed and adjusted metrics for the Lean Security categories, subcategories, and core principles respectively. Each section can also include a different graph representation of the current degree of progress in each category, subcategory, and core principle respectively. For example, section 606 includes a graph representation of assessed and adjusted values for Security, DevOps, Agile, and Compliance (e.g., as shown in FIG. 6A), as well as individual graphic representations showing the current value for each of these categories as a circular progress graph.

Figure 6C:
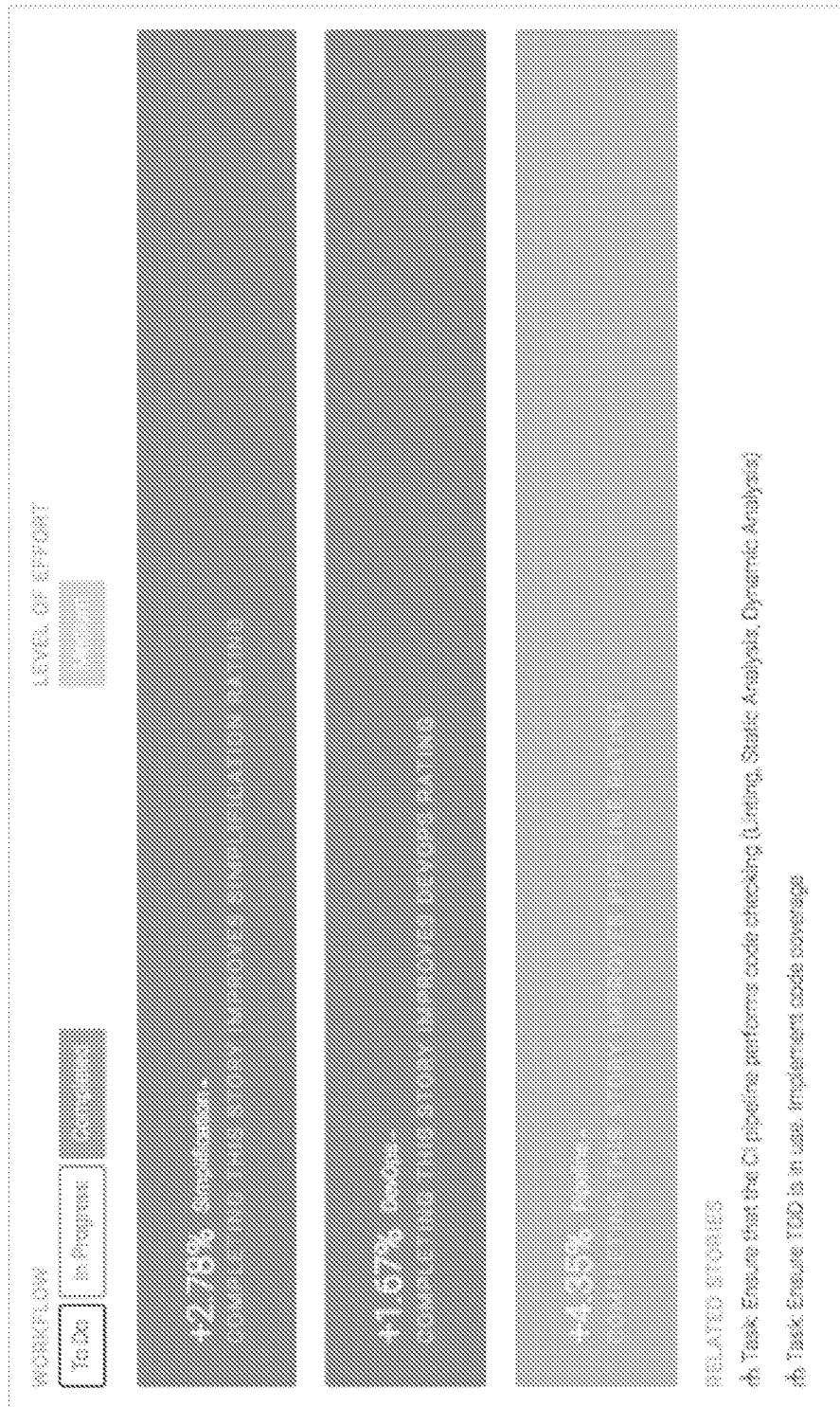

FIG. 6C shows an example screen that explains change indicators with respect to core principles, categories, and subcategories. In this example, the change indicator for a core principle (e.g., simplification) is shown in blue, a change indicator for a category (e.g., DevOps) is shown in purple, and a change indicator for a subcategory (e.g., pipeline) is shown in green. Various screens of the platform may include change indicators. A change indicator indicates the expected change (e.g., increase) in a score (e.g., for a category, subcategory, and/or core principle) due to completion of a Story, Epic, or Task. FIG. 6C depicts examples in which completing a particular Story will improve a Simplification rating by 2.78%, improve a DevOps rating by 1.67%, and improve a Pipeline rating by 4.35%. The platform may also include other help screen and/or user guides as appropriate. On various screens, a Story, Epic, or Task can be presented with a change indicator that describes the change that will occur for one or more scores due to completion of the respective Story, Epic, or Task.

Figure 6D:
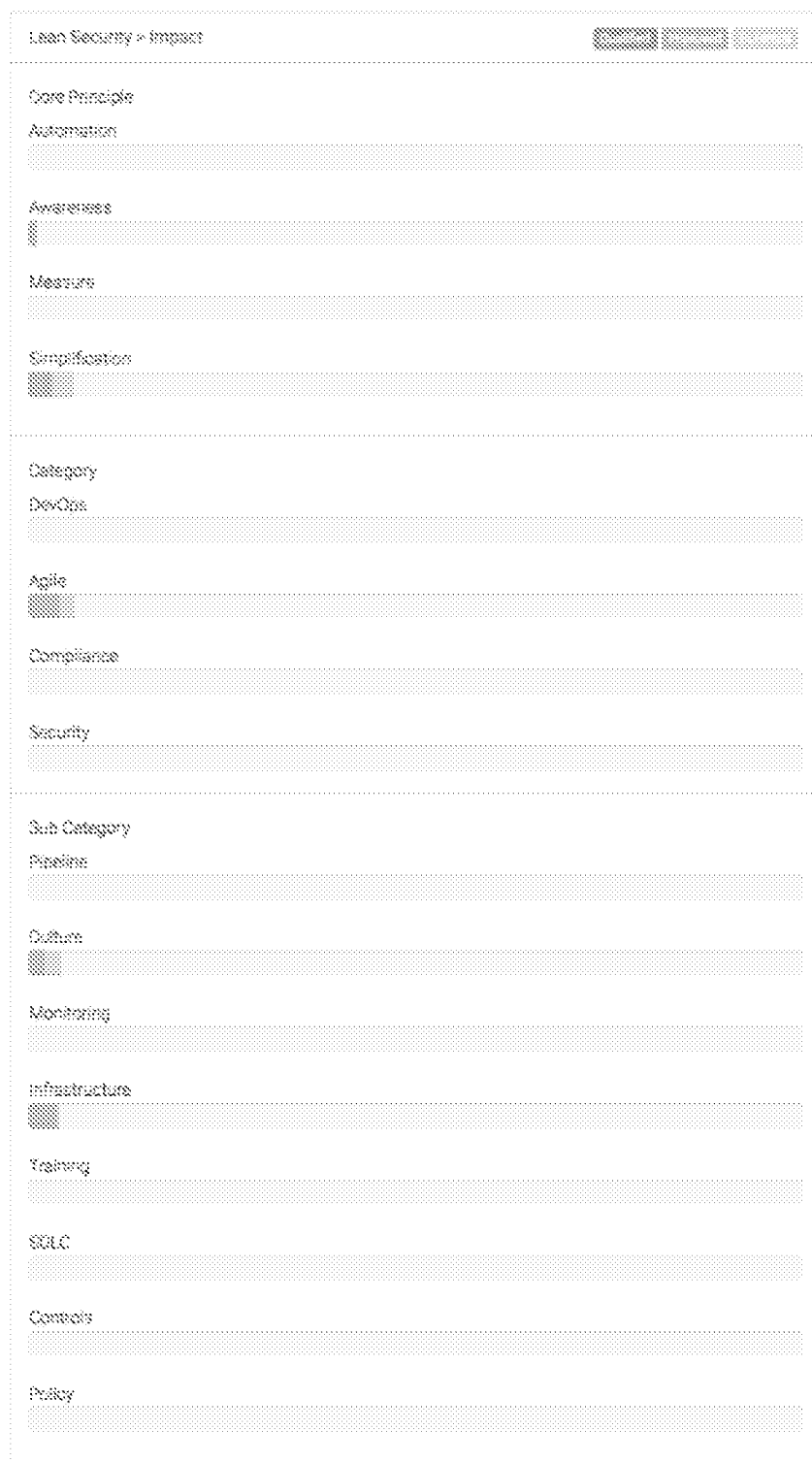

FIG. 6D shows an example screen that provides similar information to that shown in FIG. 6C, but showing how the metrics will change at the Epic level (e.g., on completion of an Epic) as opposed to changes expected for Story completion, as shown in FIG. 6C.

Figure 6E:
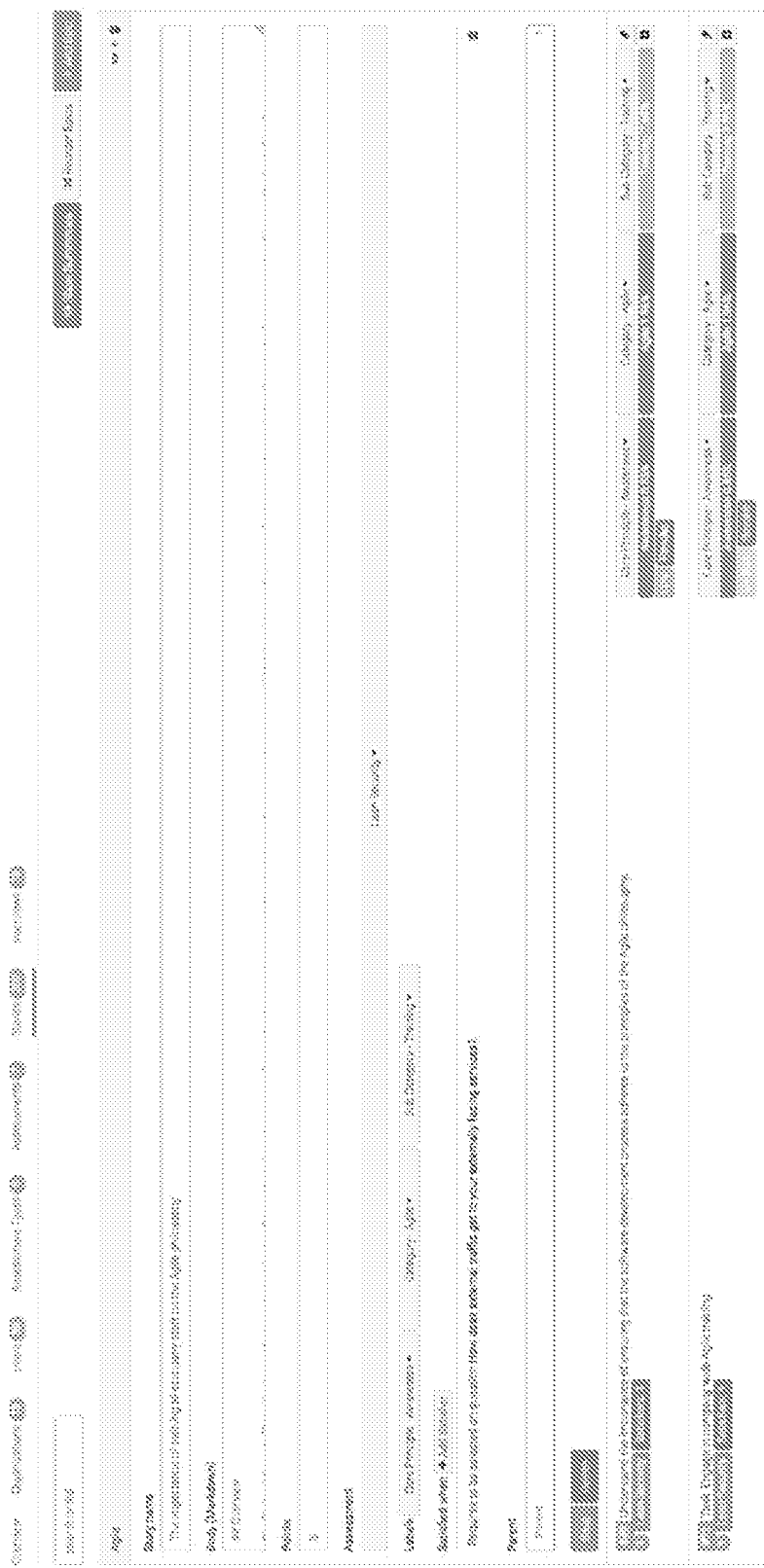

FIG. 6E shows an example screen that includes a dialog for adding a new Story to be tracked through the platform. The dialog allows an assessor user, e.g., who is using the platform to enter and/or view information as part of the assessment process, to enter various data regarding the Story, such as the story name, body, points value, assessment criteria, labels for relevant core principles, categories, and/or subcategories, a parent story (if any), satisfaction criteria, indicating the conditions when a story assessment criterion is satisfied, and/or other data. In some implementations, this screen is accessible by the assessor user who is performing the assessment of a company, but may not be accessible by a user who is an employee of the company under assessment.

Figure 6F:
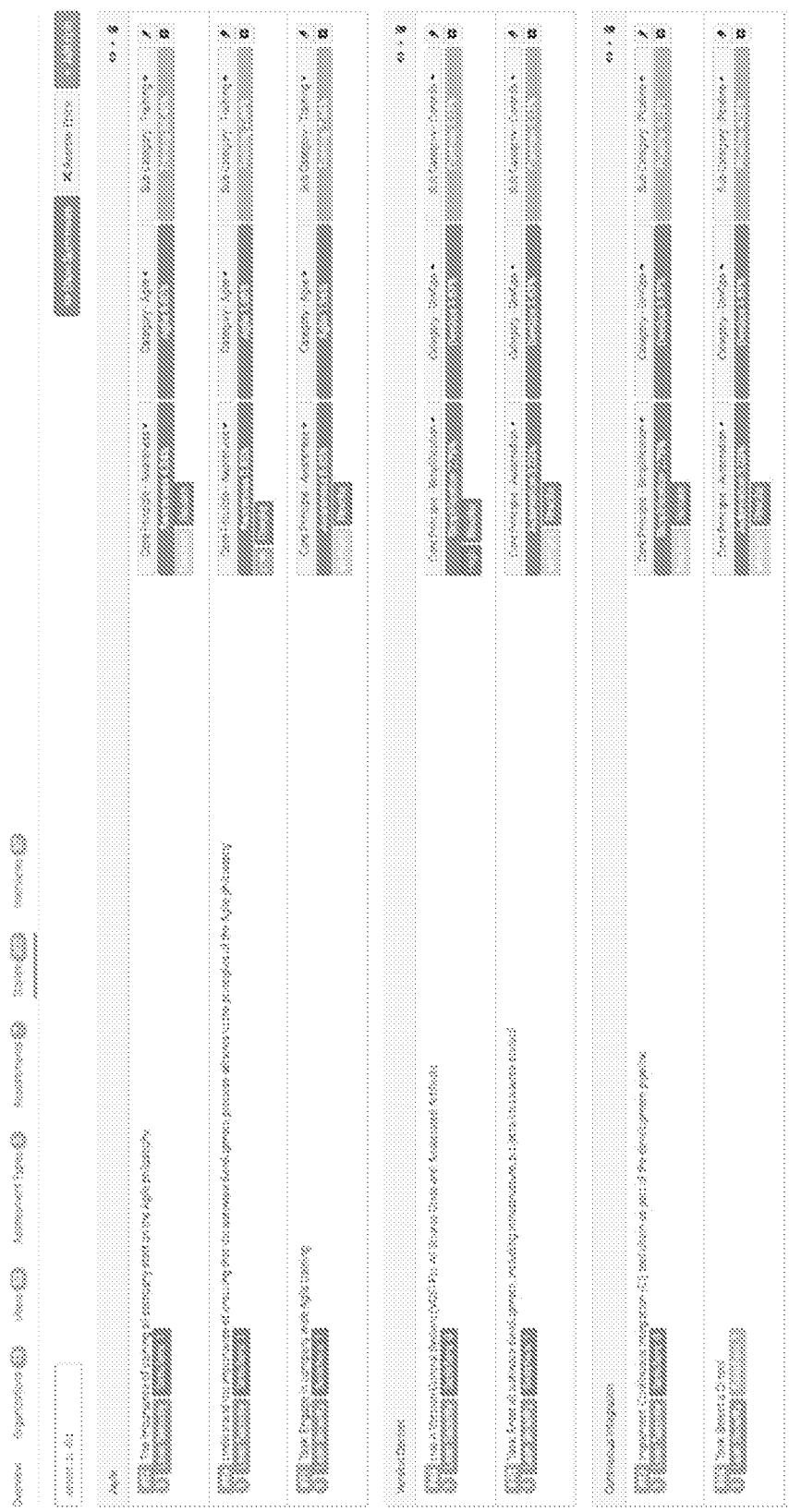

FIG. 6F shows an example screen that presents a list of Stories being tracked through the platform, the Stories grouped according to core principle, category, subcategory, or other type designation. Each Story is presented with change indicators showing the expected change in various scores for core principles, categories, and/or subcategories due to the completion of the Story.

Figure 6G:
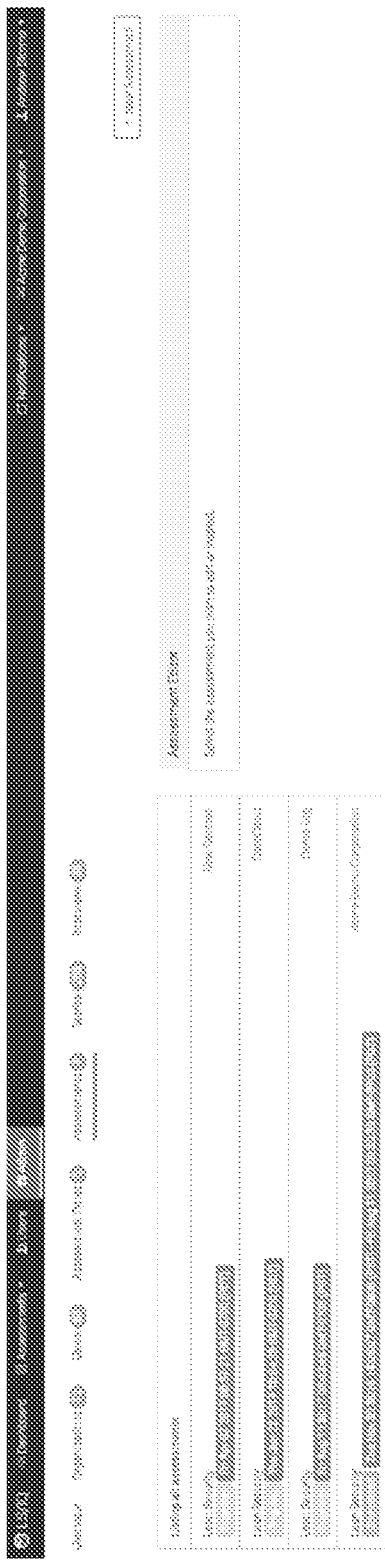
Figure 6H:
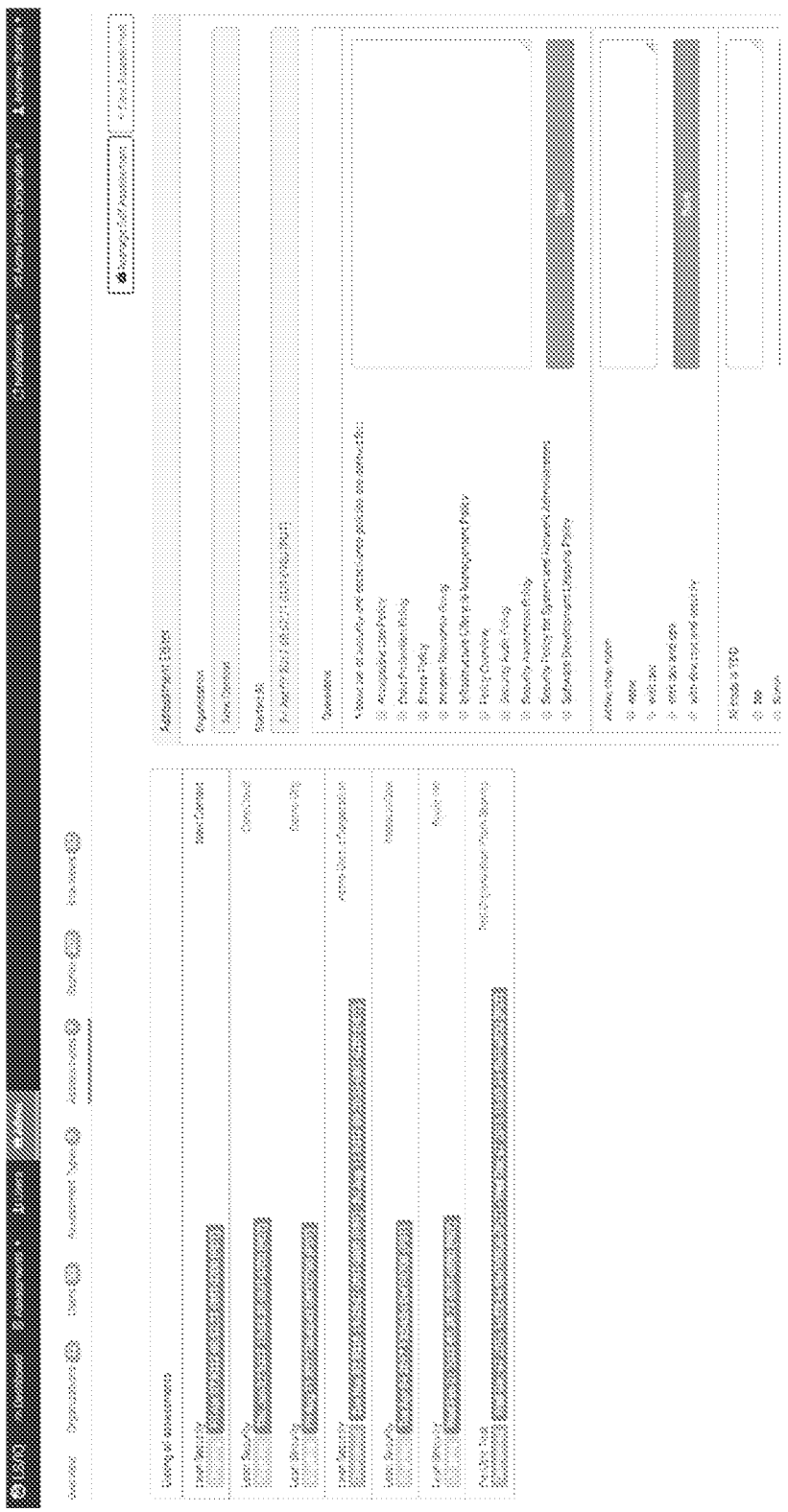

FIG. 6G shows an example screen that presents a list of assessments being tracked through the platform, and indicating whether each assessment is ongoing or completed. The screen enables a new assessment to be added. Selecting one of the assessments causes the UI to present a dialog, as shown in the example of FIG. 6H, that includes an assessment editor useable to edit an assessment.

Figure 6I:
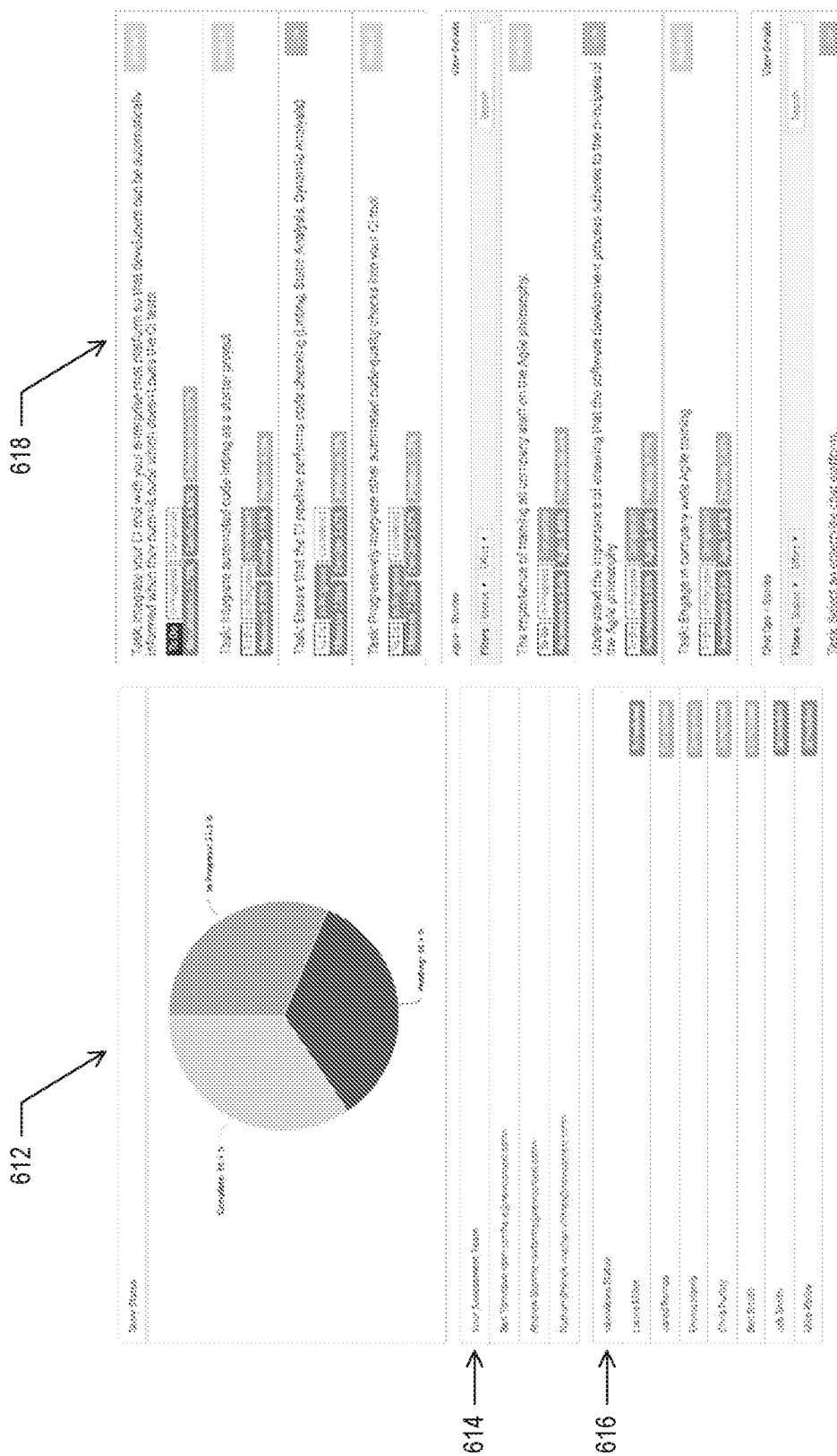

FIG. 6I shows an example screen that is a dashboard summarizing various tracked data at a high level. The screen includes a section 612 that presents a graphical depiction of the current status of the various Stories being tracked through the platform, including the percentage of Stories that are complete, in progress, and pending. The screen includes a section 614 listing the assessment team members, and a section 616 listing interviews that their status (e.g., complete or incomplete). The screen also includes a section 618 listing various Stories along with change indicators indicating how a core principle, category, and/or subcategory is expected to change due to completion of the Story. This section also shows the respective status (e.g., to do, in progress, complete) of each Story.

Figure 7:
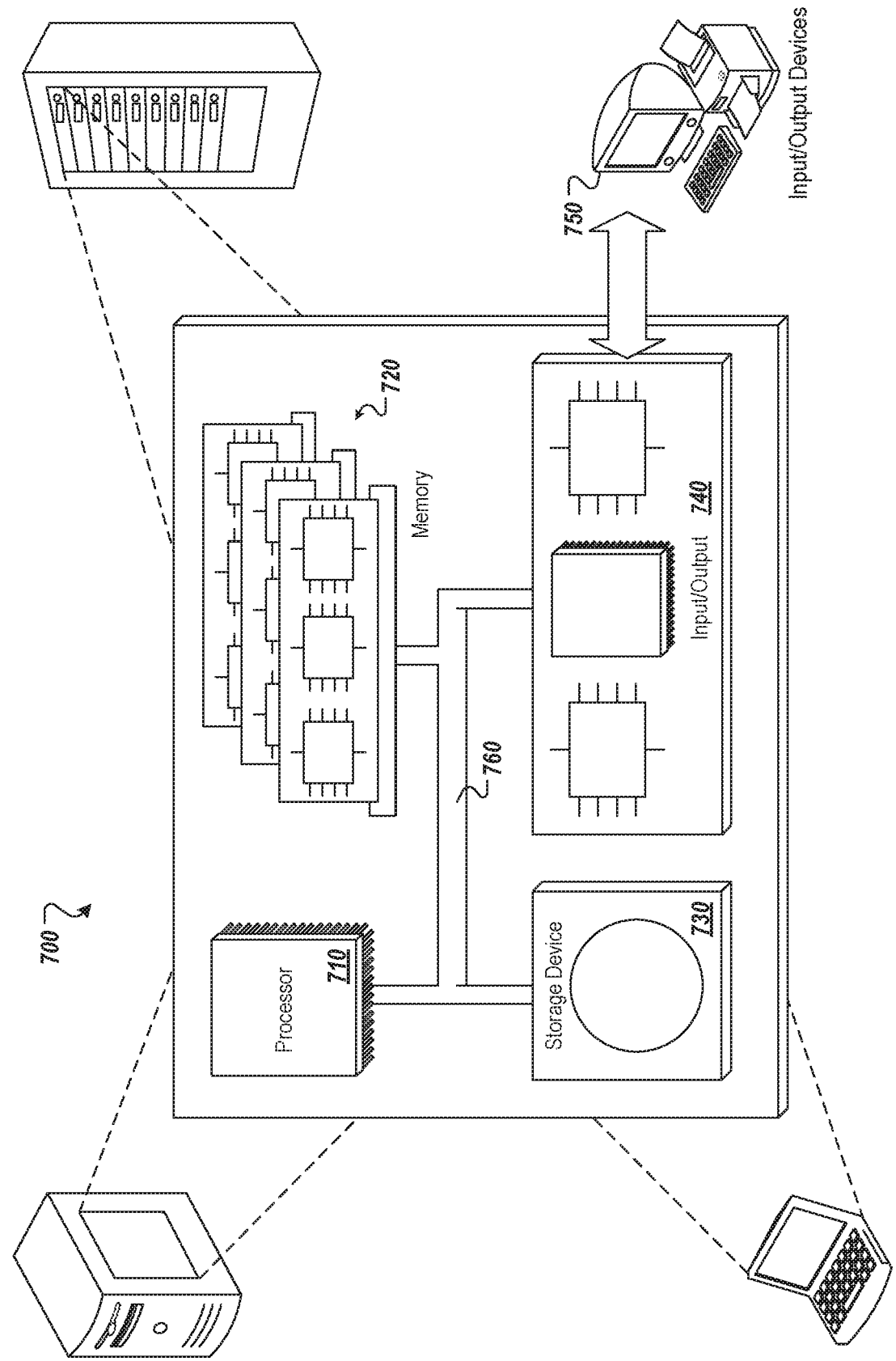
FIG. 7 depicts an example computing system, according to implementations of the present disclosure.

FIG. 7 depicts an example computing system, according to implementations of the present disclosure. The system 700 may be used for any of the operations described with respect to the various implementations discussed herein. For example, the system 700 may be included, at least in part, in one or more of the platform 102, the computing device(s) 124, the SUA(s) 120, and/or other computing device(s) or computing system(s) described herein. The system 700 may include one or more processors 710, a memory 720, one or more storage devices 730, and one or more input/output (I/O) devices 750 controllable via one or more I/O interfaces 740. The various components 710, 720, 730, 740, or 750 may be interconnected via at least one system bus 760, which may enable the transfer of data between the various modules and components of the system 700.

The processor(s) 710 may be configured to process instructions for execution within the system 700. The processor(s) 710 may include single-threaded processor(s), multi-threaded processor(s), or both. The processor(s) 710 may be configured to process instructions stored in the memory 720 or on the storage device(s) 730. For example, the processor(s) 710 may execute instructions for the various software module(s) described herein. The processor(s) 710 may include hardware-based processor(s) each including one or more cores. The processor(s) 710 may include general purpose processor(s), special purpose processor(s), or both.

The memory 720 may store information within the system 700. In some implementations, the memory 720 includes one or more computer-readable media. The memory 720 may include any number of volatile memory units, any number of non-volatile memory units, or both volatile and non-volatile memory units. The memory 720 may include read-only memory, random access memory, or both. In some examples, the memory 720 may be employed as active or physical memory by one or more executing software modules.

The storage device(s) 730 may be configured to provide (e.g., persistent) mass storage for the system 700. In some implementations, the storage device(s) 730 may include one or more computer-readable media. For example, the storage device(s) 730 may include a floppy disk device, a hard disk device, an optical disk device, or a tape device. The storage device(s) 730 may include read-only memory, random access memory, or both. The storage device(s) 730 may include one or more of an internal hard drive, an external hard drive, or a removable drive.

One or both of the memory 720 or the storage device(s) 730 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 700. In some implementations, the CRSM may include a data store that provides storage of computer-readable instructions or other information in a non-transitory format. The CRSM may be incorporated into the system 700 or may be external with respect to the system 700. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 710 and the memory 720 may be supplemented by, or incorporated into, one or more application-specific integrated circuits (ASICs).

The system 700 may include one or more I/O devices 750. The I/O device(s) 750 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 750 may also include one or more output devices such as a display, LED(s), an audio output device (e.g., a speaker), a printer, a haptic output device, and so forth. The I/O device(s) 750 may be physically incorporated in one or more computing devices of the system 700, or may be external with respect to one or more computing devices of the system 700.

The system 700 may include one or more I/O interfaces 740 to enable components or modules of the system 700 to control, interface with, or otherwise communicate with the I/O device(s) 750. The I/O interface(s) 740 may enable information to be transferred in or out of the system 700, or between components of the system 700, through serial communication, parallel communication, or other types of communication. For example, the I/O interface(s) 740 may comply with a version of the RS-232 standard for serial ports, or with a version of the IEEE 1284 standard for parallel ports. As another example, the I/O interface(s) 740 may be configured to provide a connection over Universal Serial Bus (USB) or Ethernet. In some examples, the I/O interface(s) 740 may be configured to provide a serial connection that is compliant with a version of the IEEE 1394 standard.

The I/O interface(s) 740 may also include one or more network interfaces that enable communications between computing devices in the system 700, or between the system 700 and other network-connected computing systems. The network interface(s) may include one or more network interface controllers (NICs) or other types of transceiver devices configured to send and receive communications over one or more communication networks using any network protocol.

Computing devices of the system 700 may communicate with one another, or with other computing devices, using one or more communication networks. Such communication networks may include public networks such as the internet, private networks such as an institutional or personal intranet, or any combination of private and public networks. The communication networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 700 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A computer-implemented method performed by at least one processor, the method comprising:
   receiving, by the at least one processor, input data that is provided through an assessment platform;
   analyzing, by the at least one processor, the input data to generate one or more metrics that each provide a measurement of an operational aspect of an organization, wherein the one or more metrics include one or more metrics that provide an assessment of a software or system development lifecycle (SDLC);
   generating, by the at least one processor, one or more tasks based on one or more of the input data and the one or more metrics; and
   presenting, by the at least one processor, the one or more metrics and the one or more tasks through a user interface (UI) of the assessment platform; and
   wherein the analyzing of the input data employs at least one machine learning technique, wherein the at least one machine learning technique comprises a trained machine learning classifier that predicts one or more of the one or more metrics based on the input data, wherein the trained machine learning classifier is trained using labeled training data that indicates a metric corresponding to one or more values within a set, subset, or element of the labeled training data.

2. The method of claim 1, wherein the input data is generated by at least one data collection module that executes in the assessment platform to automatically generate the input data based on examination of one or more systems under assessment (SUAs) that are associated with the organization.

3. The method of claim 1, wherein the input data is entered through the UI of the assessment platform.

4. The method of claim 3, wherein the UI presents at least one question that is answered, through the UI, to generate at least a portion of the input data.

5. The method of claim 4, wherein a particular answer to a question causes a satisfier, executing in the assessment platform, to automatically generate at least one of the one or more tasks.

6. The method of claim 1, wherein the one or more SDLC assessment metrics include one or more of a core principle metric, a category metric, and a subcategory metric.

7. The method of claim 1, wherein the one or more tasks are organized into one or more stories that each includes at least one task.

8. The method of claim 1, further comprising:
   receiving, by the at least one processor, through the UI, an indication of completion of at least one of the one or more tasks and, in response, updating at least one of the one or more metrics based on the completion of the at least one task.

9. A system comprising:
   at least one processor; and
   memory communicatively coupled to the at least one processor, the memory storing instructions which, when executed by the at least one processor, cause the at least one processor to perform operations comprising:
   receiving input data that is provided through an assessment platform;
   analyzing the input data to generate one or more metrics that each provide a measurement of an operational aspect of an organization, wherein the one or more metrics include one or more metrics that provide an assessment of a software or system development lifecycle (SDLC);
   generating one or more tasks based on one or more of the input data and the one or more metrics; and
   presenting the one or more metrics and the one or more tasks through a user interface (UI) of the assessment platform; and
   wherein the analyzing of the input data employs at least one machine learning technique, wherein the at least one machine learning technique comprises a trained machine learning classifier that predicts one or more of the one or more metrics based on the input data, wherein the trained machine learning classifier is trained using labeled training data that indicates a metric corresponding to one or more values within a set, subset, or element of the labeled training data.

10. The system of claim 9, wherein the input data is generated by at least one data collection module that executes in the assessment platform to automatically generate the input data based on examination of one or more systems under assessment (SUAs) that are associated with the organization.

11. The system of claim 9, wherein the input data is entered through the UI of the assessment platform.

12. The system of claim 11, wherein the UI presents at least one question that is answered, through the UI, to generate at least a portion of the input data.

13. The system of claim 12, wherein a particular answer to a question causes a satisfier, executing in the assessment platform, to automatically generate at least one of the one or more tasks.

14. The system of claim 9, wherein the one or more SDLC assessment metrics include one or more of a core principle metric, a category metric, and a subcategory metric.

15. The system of claim 9, wherein the one or more tasks are organized into one or more stories that each includes at least one task.

16. The system of claim 9, the operations further comprising:
receiving, through the UI, an indication of completion of at least one of the one or more tasks and, in response, updating at least one of the one or more metrics based on the completion of the at least one task.

17. One or more computer-readable storage media storing instructions which, when executed by at least one processor, cause the at least one processor to perform operations comprising:
receiving input data that is provided through an assessment platform;
analyzing the input data to generate one or more metrics that each provide a measurement of an operational aspect of an organization, wherein the one or more metrics include one or more metrics that provide an assessment of a software or system development lifecycle (SDLC);
generating one or more tasks based on one or more of the input data and the one or more metrics; and
presenting the one or more metrics and the one or more tasks through a user interface (UI) of the assessment platform; and
wherein the analyzing of the input data employs at least one machine learning technique, wherein the at least one machine learning technique comprises a trained machine learning classifier that predicts one or more of the one or more metrics based on the input data, wherein the trained machine learning classifier is trained using labeled training data that indicates a metric corresponding to one or more values within a set, subset, or element of the labeled training data.

18. The method of claim 1, wherein the tasks are oriented for achieving one or more objectives of the organization, wherein the one or more objectives include a software delivery pipeline time-to-market objective.

19. The method of claim 1, wherein the one or more SDLC assessment metrics comprise metrics for a plurality of categories, wherein the categories include a DevOps category.

20. The method of claim 19, wherein the categories further include a security category, an agile category, and a compliance category.

21. The system of claim 9, wherein the tasks are oriented for achieving one or more objectives of the organization, wherein the one or more objectives include a software delivery pipeline time-to-market objective.

22. The system of claim 9, wherein the one or more SDLC assessment metrics comprise metrics for a plurality of categories, wherein the categories include a DevOps category.

23. The system of claim 22, wherein the categories further include a security category, an agile category, and a compliance category.

24. The one or more computer-readable storage media of claim 17, wherein the tasks are oriented for achieving one or more objectives of the organization, wherein the one or more objectives include a software delivery pipeline time-to-market objective.

25. The one or more computer-readable storage media of claim 17, wherein the one or more SDLC assessment metrics comprise metrics for a plurality of categories, wherein the categories include a DevOps category.

26. The one or more computer-readable storage media of claim 25, wherein the categories further include a security category, an agile category, and a compliance category.

* * * * *